(12) United States Patent
Richet et al.

(10) Patent No.: US 8,636,827 B2
(45) Date of Patent: Jan. 28, 2014

(54) METHOD OF OPERATING A MIXED IONIC-ELECTRONIC CONDUCTING CERAMIC MEMBRANE

(75) Inventors: Nicolas Richet, Fontenay-le-Fleury (FR); Cédric Delbos, Le Coudray Montceaux (FR); Gilles Lebain, Thiais (FR)

(73) Assignee: L'Air Liquide Société Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 157 days.

(21) Appl. No.: 13/166,447

(22) Filed: Jun. 22, 2011

(65) Prior Publication Data

US 2012/0000360 A1     Jan. 5, 2012

(30) Foreign Application Priority Data

Jul. 1, 2010   (FR) ...................................... 10 55268

(51) Int. Cl.
*B01D 53/22*     (2006.01)

(52) U.S. Cl.
USPC .............. 95/54; 95/43; 95/45; 96/4; 252/373; 137/14

(58) Field of Classification Search
USPC ............ 95/43, 45, 54; 96/4; 137/14; 252/373
See application file for complete search history.

(56) References Cited

U.S. PATENT DOCUMENTS

| | | | | |
|---|---|---|---|---|
| 5,643,355 A * | 7/1997 | Phillips et al. | ....................... | 96/4 |
| 6,695,985 B2 * | 2/2004 | Igarashi et al. | ............ | 252/518.1 |
| 7,122,072 B2 * | 10/2006 | Carolan et al. | ..................... | 95/54 |
| 7,311,755 B2 * | 12/2007 | Carolan | ............................ | 95/54 |
| 7,468,092 B2 * | 12/2008 | Carolan | ............................ | 95/54 |
| 8,246,719 B2 * | 8/2012 | Carolan et al. | ..................... | 95/54 |
| 2002/0155061 A1 * | 10/2002 | Prasad et al. | .................. | 423/652 |
| 2005/0106439 A1 * | 5/2005 | Carolan et al. | .................. | 429/33 |
| 2006/0060080 A1 * | 3/2006 | Carolan | ............................ | 95/54 |
| 2006/0060081 A1 * | 3/2006 | Carolan | ............................ | 95/54 |
| 2010/0176347 A1 | 7/2010 | Richet et al. | | |
| 2011/0076213 A1 * | 3/2011 | Carolan et al. | ................. | 423/219 |
| 2013/0037750 A1 * | 2/2013 | Gualy et al. | .................. | 252/373 |

FOREIGN PATENT DOCUMENTS

| | | |
|---|---|---|
| EP | 1 531 149 | 5/2005 |
| EP | 1 637 215 | 3/2006 |
| FR | 2 917 307 | 12/2008 |

OTHER PUBLICATIONS

French Search Report for FR 10 55268, Jan. 28, 2011.

* cited by examiner

*Primary Examiner* — Jason M Greene
*Assistant Examiner* — Anthony Shumate
(74) *Attorney, Agent, or Firm* — Elwood L. Haynes

(57) ABSTRACT

A method of operating a mixed ionic-electronic conducting ceramic membrane having an oxidizing side and a reducing side, said method comprising a start-up phase and a production phase, for producing a gas stream, characterized in that the start-up phase comprises a step of introducing, on the oxidizing side and the reducing side of the membrane respectively, first and second gas mixtures not capable of chemically degrading the membrane; and a step of establishing a stream of oxygen through the membrane.

22 Claims, No Drawings

METHOD OF OPERATING A MIXED IONIC-ELECTRONIC CONDUCTING CERAMIC MEMBRANE

CROSS REFERENCE TO RELATED APPLICATIONS

This application claims the benefit of priority under 35 U.S.C. §119 (a) and (b) to French Application No. 10 55268 filed Jul. 1, 2010, the entire contents of which are incorporated herein by reference.

FIELD OF THE INVENTION

The subject of the present invention is a method of operating a mixed ionic-electronic conducting ceramic membrane.

BACKGROUND

Mixed ionic-electronic conducting ceramic membranes are of great interest for applications in catalytic reactors for the separation of oxygen and the conversion of hydrocarbons into added-value products, in particular the conversion of methane to syngas.

Catalytic membrane reactors, hereinafter called CMRs, produced from ceramics, allow the separation of oxygen from air, by making this oxygen diffuse in ionic form through the ceramic, and the chemical reaction of the latter with natural gas (principally methane) on catalytic sites (Ni or noble metal particles) deposited on the surface of the membrane.

However, ceramic membranes are by nature brittle materials which can withstand only very small deformations and have a very low ductility compared with metals. The various stresses exerted on a ceramic membrane are all the higher when the ceramic membrane is in a transient phase, i.e. in an off-equilibrium state between two steady states. Thus, for example, stresses develop in ceramic membranes within a CMR mainly during the start-up and shut-down phases.

The dimensions of a mixed ionic-electronic conducting ceramic membrane change when it is subjected to temperature changes. This is then referred to as thermal expansion.

Likewise, mixed ionic-electronic conducting ceramic membranes have the particular feature when they are subjected to a difference in oxygen partial pressure of letting $O^{2-}$ ions pass through them by a vacancy ion diffusion mechanism in the crystal lattice of the ceramic. The diffusion of oxygen or a modification in the concentration of oxygen vacancies in the material results in a deformation of the crystal unit cell, called chemical expansion.

In particular during the start-up phase of a mixed ionic-electronic conducting ceramic membrane, the chemical reduction (loss of oxygen) of the material constituting the membrane may cause very rapid chemical expansion capable of fracturing the membrane.

It is therefore imperative for the start-up phase of the mixed ionic-electronic conducting ceramic membrane to be controlled and carried out prudently.

SUMMARY OF THE INVENTION

The present invention relates to a method of operating a mixed ionic-electronic conducting ceramic membrane having an oxidizing side and a reducing side. The method comprises a start-up phase and a production phase for producing a gas stream. The start-up phase comprises a step of introducing, on the oxidizing side and the reducing side of the membrane respectively, first and second gas mixtures not capable of chemically degrading the membrane, heating the membrane to a temperature $T_0$, enabling the $O^{2-}$ ions to diffuse into the membrane, enriching the oxidizing side with oxygen in order to achieve the oxygen content used during the production phase and establishing an oxygen stream through the membrane.

DETAILED DESCRIPTION OF THE INVENTION

One solution provided by the present invention is a method of operating a mixed ionic-electronic conducting ceramic membrane having an oxidizing side and a reducing side, the method comprising a start-up phase and a production phase, for producing a gas stream, characterized in that the start-up phase comprises:
  a step of introducing, on the oxidizing side and the reducing side of the membrane respectively, first and second gas mixtures that are not capable of chemically degrading the membrane; and
  a step of establishing an oxygen stream through the membrane.

The term "oxidizing side" is understood to mean that surface of the membrane which is exposed to the highest oxygen partial pressure. The term "reducing side" is understood to mean that surface of the membrane which is exposed to the lowest oxygen partial pressure.

The oxygen stream is progressively established via several simultaneous phenomena: the formation of oxygen vacancies in the material (in general on the reducing side, but also possibly on the oxidizing side); the adsorption/dissociation of oxygen and then the absorption of $O^{2-}$ ions in the crystal lattice of the material (on the oxidizing side); the volume diffusion of the $O^{2-}$ ions in the material; and then, on the reducing side, the recombination of the $O^{2-}$ ions into $O_2$ followed by the desorption of $O_2$. The kinetics of these phenomena are different and dependent on the materials and on the structure of the membrane (deposition of porous layers to increase the surface exchange rates). In general, during the transient phases, the surface phenomena are more rapid than the volume phenomena, which order may be reversed during the steady-state phases. The first step of the start-up procedure therefore consists in "initiating" the volume diffusion of the $O^{2-}$ ions in the least damaging way for the membrane. The use, on the reducing side, of a gas or a gas mixture which is chemically inert with respect to the membrane and has an oxygen partial pressure below that used on the oxidizing side enables the volume diffusion of $O^{2-}$ ions to be established without causing damage.

It is essential to establish this oxygen stream through the membrane before introducing the gas or gases liable to reduce the membrane, so as to ensure the rapid supply of oxygen, by ionic conduction, and to maintain a sufficient oxygen concentration through the thickness of the membrane and at the surface on the reducing side. Consequently, upon introducing the reducing gas, the oxygen available by ionic conduction through the membrane rapidly compensates for that which is consumed by the reaction with the reducing atmosphere.

If the stream of oxygen, established by ionic conduction, is not initiated before the reducing atmosphere is introduced, the response time of the membrane is too long to compensate for the consumption of the oxygen associated with the chemical reaction with the reducing atmosphere. The material becomes depleted little by little until partially or completely decomposing or else resulting in a critical chemical expansion causing it to fracture.

Depending on the case, the method according to the invention may have one or more of the following features:
  the start-up phase comprises, in succession:
    a) said step of introducing, on the oxygen side and the reducing side of the membrane respectively, first and second gas mixtures not capable of chemically degrading the membrane;
    b) a step of heating the membrane to a temperature $T_0$, enabling the $O^{2-}$ ions to diffuse into the membrane;

c) a step of enriching the oxidizing side with oxygen in order to achieve the oxygen content used during the production phase;

d) the step of establishing a stream of oxygen through the membrane: it should be noted that step c) is unnecessary if the gas used during step a) is already that used for the production step;

steps b) and c) are carried out simultaneously;

in step a), the first and second gas mixtures introduced on the oxidizing side and the reducing side of the membrane are is chosen from the following pairs: air/$N_2$; air/Ar; air/He; Ar/$N_2$; Ar/He; $N_2$/He; $N_2$/$N_2$; Ar/Ar; He/He; (air+x % $O_2$)/Ar with 0<x<100%; and (air+x % $O_2$)/$N_2$ with 0<x<100%;

the start-up phase comprises, after steps a) to d):

e) a step of heating the membrane to the temperature $T_1$ used during the production phase; and f) a step of enriching the reducing side with reducing gas in order to achieve the reducing gas content used during the production phase;

steps e) and f) may be carried out simultaneously;

in step f) the rate of enrichment with reducing gas is less than about 0.5%/min, preferably less than about 0.2%/min, for a reducing gas content on the reducing side of between 0% and about 10%, and then less than about 1%/min for a reducing gas content on the reducing side of between about 10% and about 100%;

the reducing gas used in step d) comprises methane and the gas stream produced during the production phase is syngas;

the ceramic membrane comprises a composite comprising at least about 75% by volume of a hybrid conducting compound that conducts via electrons and via $O^{2-}$ oxygen anions, chosen from doped ceramic oxides which, at the use temperature, are in the form of a perovskite phase; and about 0% to about 25% by volume of a blocking compound, different from the conducting compound, chosen from oxide or non-oxide ceramics, metals, metal alloys, or mixtures of these various types of material;

the ceramic membrane is in the form of a tube or a hollow fibre.

In general, the relationships 450° C.<$T_0$<900° C. and 700° C.<$T_1$<1000° C. apply. For example for a material of the $La_{0.8}Sr_{0.2}Fe_{0.7}Ga_{0.3}O_{3-\delta}$ type, the temperature $T_0$ is about 500° C. The temperature $T_1$ essentially depends on the method and on the intensity with which it is desired to conduct it. It should be noted that the temperature $T_0$ may be equal to the temperature $T_1$.

The membrane may be heated by direct external heating (electric heating, burners, etc.) and/or by means of hot gases and/or by exothermic chemical reaction.

The invention will now be described in more detail. The start-up phase may be decomposed into a succession of steps having the function of placing the membrane under experimental operating conditions without damaging it:

Step a): Introduction of Inert Atmospheres that are Chemically Inert with Respect to the Membrane.

First and second gas mixtures not capable of chemically degrading the membrane are introduced on the oxidizing side and the reducing side of the membrane respectively. The oxygen partial pressure is below that at which the membrane is in chemical equilibrium (in other words, the oxygen partial pressure under which the membrane was manufactured). For example, the membrane may be manufactured in air and started up in nitrogen. Under these conditions, oxygen vacancies may be created with the rise in temperature, but the rate of creation is slow and does not lead to fracture of the membrane.

Step b): Heating of the Membrane to a Temperature Sufficient for Obtaining Volume Diffusion of Oxygen.

The diffusion of oxygen through the membrane is thermally activated. It is necessary to achieve a minimum temperature, which essentially depends on the formulation of the membrane, in order to obtain a stream of oxygen in a reasonable time. The membrane is heated from room temperature up to a temperature $T_0$, which depends on the material used and which allows the $O^{2-}$ ions to diffuse through the volume of the perovskite. The temperature $T_0$ may be equal to the production temperature $T_1$.

Step c): Progressive Enrichment with Oxygen on the Oxidizing Side in Order to Achieve the Final Content used in the Method.

The oxygen partial pressure is increased on the oxidizing side up to the value desired for the method. The rate of enrichment may be high (10-20%/10 min) since the absorption of the ions in the structure is slow. In the extreme case, steps b) and c) may be carried out simultaneously.

Step d): Establishment of a Steady Stream of Oxygen through the Membrane.

This step is the key point of the procedure, namely waiting for a steady stream of oxygen to be established through the membrane. The diffusion of oxygen ions through a membrane of sufficiently small thickness, or a membrane made of a material which is a very good ion conductor, will then be limited by surface exchanges on the reducing side or the oxidizing side. The situation will preferentially be that in which the diffusion is limited by exchanges on the reducing side. This means that any modification of the "oxygen demand" on the reducing side, associated with introducing a reactive gas or gas mixture, will be satisfied without reducing the membrane.

Step e): Heating of the Membrane up to the Temperature of the Method.

The membrane is heated up to the temperature $T_1$ of the method. During this step, the stream of oxygen increases, before reaching a steady state.

Step f): Progressive Enrichment with Natural Gas on the Reducing Side.

When the steady state is reached, the membrane may rapidly adapt to any modification of the operating conditions. It is possible to introduce the active (i.e. reducing) gases on the reducing side of the membrane. In the case of syngas production, this essentially involves natural gas and steam.

Steps b) and c) or e) and f) may be carried out simultaneously. This requires an in-depth knowledge of the behaviour of the membrane with respect to modifications of the operating conditions.

The membranes used preferably have the following general chemical composition:

with A: La, Ba, Ce
A': Sr, Ca
B: Fe
B': Ga, Ti, Co, Zr
0<x<1
0<y<1
δ: the oxygen vacancy concentration necessary to ensure electrical neutrality of the material.

The preferred formulation is $La_{1-x}Sr_xFe_{1-y}Ga_yO_{3-\delta}$ with 1<x<5 and 1<y<5 for the production of syngas.

The examples below were produced by means of an experimental rig. These examples involve the production of syngas using a perovskite membrane and illustrate the need to comply with the claimed steps. For better understanding, the examples will be split into two categories:

Examples 1, 2 and 3: Establishment of a stream of oxygen in air/inert gas and heating to the temperature of the method Examples 4, 5 and 6: enrichment with active gas (natural gas and steam) on the reducing side.

The examples presented below illustrate the benefit of the steps of the claimed start-up procedure, in particular the establishment of a stream of oxygen before the active gases are introduced and the control of the enrichment with active gases. These trials were carried out on membranes that are identical in terms of formulation, architecture and geometry.

Example 1

| Temperature (° C.) | | Heating rate | Atmospheres on either side of the membrane | | Duration | Type of step |
|---|---|---|---|---|---|---|
| $T_{initial}$ | $T_{final}$ | | Reducing side | Oxidizing side | | |
| 15 | 650 | 5° C./min | Ar | $N_2$ | 2 h 10 min | Transient |
| 650 | 650 | — | Ar | $N_2 \rightarrow$ Air | 1 h 30 min | Transient |
| 650 | 650 | — | Ar | Air | 48 h | Steady-state |
| 650 | 900 | 5° C./min | Ar | Air | 50 min | Transient |
| 900 | 900 | — | Ar | Air | 5 h | Steady-state |

This procedure separates all the steps needed for conditioning the membrane. In a first step, the membrane is heated to a sufficient temperature $T_0$ for establishing a stream of oxygen and then the atmosphere on the oxidizing side is progressively enriched with oxygen in order to reach 21%. Air is then sent over the membrane and a steady stream of oxygen is established over 48 h. Next, the membrane is heated up to the temperature $T_1$ used during the production phase and a steady stream of oxygen is established over 5 h.

This procedure is the longest one.

Example 2

| Temperature (° C.) | | Heating rate | Atmospheres on either side of the membrane | | Duration | Type of step |
|---|---|---|---|---|---|---|
| $T_{initial}$ | $T_{final}$ | | Reducing side | Oxidizing side | | |
| 15 | 650 | 5° C./min | Ar | $N_2$ | 2 h 10 min | Transient |
| 650 | 650 | — | Ar | $N_2 \rightarrow$ Air | 1 h 30 min | Transient |
| 650 | 900 | 5° C./min | Ar | Air | 50 min | Transient |
| 900 | 900 | — | Ar | Air | 5 h | Steady-state |

The difference in relation to Example 1 lies in the fact that there is no need to wait for a steady stream of oxygen to be established upon enrichment with oxygen at 650° C. The membrane is heated up to the temperature of the method immediately after air has been injected on the oxidizing side. This procedure makes it possible for the time required for start-up to be significantly reduced. Nevertheless, the establishment of a steady stream of oxygen at the production temperature is the key point to be respected.

Example 3

| Temperature (° C.) | | Heating rate | Atmospheres on either side of the membrane | | Duration | Type of step |
|---|---|---|---|---|---|---|
| $T_{initial}$ | $T_{final}$ | | Reducing side | Oxidizing side | | |
| 15 | 900 | 5° C./min | Ar | Air | 2 h | Transient |
| 900 | 900 | — | Ar | Air | 5 h | Steady-state |

In this example, the air is introduced on the oxidizing side right from the start. The membrane is heated up to the temperature $T_1$ used during the production phase without holding at this temperature, and without waiting for a steady stream of oxygen to be established at the intermediate temperatures. The membrane is simply stabilized at 900° C. over 5 h so as to establish the steady stream of oxygen before the active gases are introduced.

It should be noted that these three procedures consequently do not fracture the membrane.

Example 4

⇒ Systematic Membrane Fracture

| Temperature (° C.) | | Heating rate | Atmospheres on either side of the membrane | | Duration | Type of step |
|---|---|---|---|---|---|---|
| $T_{initial}$ | $T_{final}$ | | Reducing side | Oxidizing side | | |
| 900 | 900 | — | Ar → $CH_4$ | Air | 1 min to 10 h | Transient |

This example illustrates the need to establish a stream of oxygen before the active gases are introduced. During these trials, no stream of oxygen was measured before the active gases were introduced. Irrespective of the rate of enrichment used, the membrane fractures. This is explained by the fact that as soon as the first $CH_4$ molecules are introduced, they reduce the membrane by reacting with the oxygen that it contains. This leads to the formation of oxygen vacancies and an extremely rapid and localized chemical expansion, resulting in systematic fracture of the membrane.

Example 5

⇒ Systematic Membrane Fracture

| Temperature (° C.) | | Heating rate | Atmospheres on either side of the membrane | | Duration | Type of step |
|---|---|---|---|---|---|---|
| $T_{initial}$ | $T_{final}$ | | Reducing side | Oxidizing side | | |
| 900 | 900 | — | Ar → 100% $CH_4$ | Air | Instantaneous or very rapid <1 h | Transient |

This example illustrates a second aspect of the invention. In this case, a stream of oxygen is established in air/inert gas before commencing the enrichment with active (i.e. reducing) gas. However, the enrichment is carried out at a very rapid rate, causing the membrane to be placed in a state in which the diffusion of oxygen is limited by the volume diffusion. This results, as in Example 4, in the reduction of the surface layer, a rapid and localized chemical expansion and fracture of the membrane.

Example 6

No Membrane Fracture in the Trials Carried Out

| Temperature (° C.) | | Heating rate | Atmospheres on either side of the membrane | | Duration | Type of step |
|---|---|---|---|---|---|---|
| $T_{initial}$ | $T_{final}$ | | Reducing side | Oxidizing side | | |
| 900 | 900 | — | Ar → 10% $CH_4$ | Air | 1 h 30 min | Transient |
| | | | 10% → 100% $CH_4$ | Air | 2 h | Transient |
| | | | 100% $CH_4$ | Air | ~48 h | Steady-state |

This example represents a start-up procedure that does not damage the membrane. After the stream of oxygen has been established through the membrane using one of the procedures described in Examples 1 to 3, the first $CH_4$ molecules are introduced slowly up to a content of about 10%. The rate of enrichment is then accelerated, so as to reach the conditions of the method. The stream of oxygen is stabilized after about 48 h.

What is claimed is:

1. A method of operating a mixed ionic-electronic conducting ceramic membrane having an oxidizing side and a reducing side, said method comprising a start-up phase and a production phase, for producing a gas stream, characterized in that the start-up phase comprises, in succession:
    a) a step of introducing, on the oxidizing side and the reducing side of the membrane respectively, first and second gas mixtures chosen from the following pairs: air/N2; air/Ar; air/He; Ar/N2; Ar/He; N2/He; N2/N2; Ar/Ar; He/He; (air+x % O2)/Ar with 0<x<100%; and (air+x % O2)/N2 with 0<x<100%;
    b) a step of heating the membrane to a temperature T0, enabling the O2− ions to diffuse into the membrane;
    c) a step of enriching the oxidizing side with oxygen in order to achieve the oxygen content used during the production phase; and
    d) a step of establishing an oxygen stream through the membrane
    wherein the ceramic membrane comprises a composite comprising:
        at least 75% by volume of a hybrid conducting compound that conducts via electrons and via O2− oxygen anions, chosen from doped ceramic oxides which, at the use temperature, are in the form of a perovskite phase; and 0 to 25% by volume of a blocking compound, different from the conducting compound, chosen from oxide or non-oxide ceramics, metals, metal alloys, or mixtures of these various types of material.

2. The method of claim 1, wherein steps b) and c) are carried out simultaneously.

3. The method of claim 1, wherein the start-up phase comprises, after steps a) to d) the additional steps of:
   e) a step of heating the membrane to the temperature T1 used during the production phase; and
   f) a step of enriching the reducing side with reducing gas in order to achieve the reducing gas content used during the production phase.

4. The method of claim 3, characterized in that steps e) and f) are carried out simultaneously.

5. The method of claim 2, wherein the start-up phase comprises, after steps a) to d) the additional steps of:
   e) a step of heating the membrane to the temperature T1 used during the production phase; and
   f) a step of enriching the reducing side with reducing gas in order to achieve the reducing gas content used during the production phase.

6. The method of claim 5, characterized in that steps e) and f) are carried out simultaneously.

7. The method of claim 3, wherein in step f) the rate of enrichment with reducing gas is less than 0.5%/min for a reducing gas content on the reducing side of between 0% and 10% and then less than 1%/min for a reducing gas content on the reducing side of between 10% and 100%.

8. The method of claim 7, wherein in step f) the rate of enrichment with reducing gas is less than 0.2%/min.

9. The method of claim 4, wherein in step f) the rate of enrichment with reducing gas is less than 0.5%/min for a reducing gas content on the reducing side of between 0% and 10% and then less than 1%/min for a reducing gas content on the reducing side of between 10% and 100%.

10. The method of claim 9, wherein in step f) the rate of enrichment with reducing gas is less than 0.2%/min.

11. The method of claim 5, wherein in step f) the rate of enrichment with reducing gas is less than 0.5%/min for a reducing gas content on the reducing side of between 0% and 10% and then less than 1%/min for a reducing gas content on the reducing side of between 10% and 100%.

12. The method of claim 11, wherein in step f) the rate of enrichment with reducing gas is less than 0.2%/min.

13. The method of claim 6, wherein in step f) the rate of enrichment with reducing gas is less than 0.5%/min for a reducing gas content on the reducing side of between 0% and 10% and then less than 1%/min for a reducing gas content on the reducing side of between 10% and 100%.

14. The method of claim 13, wherein in step f) the rate of enrichment with reducing gas is less than 0.2%/min.

15. The method of claim 3, wherein the reducing gas used in step d) comprises methane and the gas stream produced during the production phase is syngas.

16. The method of claim 5, wherein the reducing gas used in step d) comprises methane and the gas stream produced during the production phase is syngas.

17. The method of claim 1, wherein the ceramic membrane is in the form of a tube.

18. The method of claim 3, wherein the ceramic membrane comprises a composite comprising:
   at least 75% by volume of a hybrid conducting compound that conducts via electrons and via O2− oxygen anions, chosen from doped ceramic oxides which, at the use temperature, are in the form of a perovskite phase; and
   0 to 25% by volume of a blocking compound, different from the conducting compound, chosen from oxide or non-oxide ceramics, metals, metal alloys, or mixtures of these various types of material.

19. The method of claim 18, wherein the ceramic membrane is in the form of a tube.

20. The method of claim 5, wherein the ceramic membrane comprises a composite comprising:
   at least 75% by volume of a hybrid conducting compound that conducts via electrons and via O2− oxygen anions, chosen from doped ceramic oxides which, at the use temperature, are in the form of a perovskite phase; and
   0 to 25% by volume of a blocking compound, different from the conducting compound, chosen from oxide or non-oxide ceramics, metals, metal alloys, or mixtures of these various types of material.

21. The method of claim 20, wherein the ceramic membrane is in the form of a tube.

22. The method of claim 20, characterized in that steps e) and f) are carried out simultaneously.

* * * * *